US010870536B2

(12) United States Patent
Holas et al.

(10) Patent No.: US 10,870,536 B2
(45) Date of Patent: Dec. 22, 2020

(54) AUTOMATED STORAGE SYSTEM FOR TRANSPORTING LOAD CARRIERS ROTATED INTO A TRAVEL DIRECT

(71) Applicant: KNAPP AG, Hart bei Graz (AT)

(72) Inventors: Johannes Holas, Stattegg (AT); Bernhard Gütl, Kainbach bei Graz (AT); Franz Hornhofer, Kainbach (AT); Marc Pendl, Feldbach (AT); Michael Wend, Bielefeld (DE); Dirk Sieksmeier, Spenge (DE); Franz Mathi, Gleisdorf (AT)

(73) Assignee: KNAPP AG, Hart bei Graz (AT)

( * ) Notice: Subject to any disclaimer, the term of this patent is extended or adjusted under 35 U.S.C. 154(b) by 77 days.

(21) Appl. No.: 16/332,209

(22) PCT Filed: Aug. 18, 2017

(86) PCT No.: PCT/AT2017/060204
§ 371 (c)(1),
(2) Date: Mar. 11, 2019

(87) PCT Pub. No.: WO2018/045403
PCT Pub. Date: Mar. 15, 2018

(65) Prior Publication Data
US 2019/0210800 A1 Jul. 11, 2019

(30) Foreign Application Priority Data
Sep. 9, 2016 (AT) .............................. A 50798/2016

(51) Int. Cl.
B65G 1/04 (2006.01)

(52) U.S. Cl.
CPC .... B65G 1/0457 (2013.01); B65G 2201/0229 (2013.01)

(58) Field of Classification Search
CPC combination set(s) only.
See application file for complete search history.

(56) References Cited

U.S. PATENT DOCUMENTS 3,734,027 A * 5/1973 Brummett .............. B65G 17/20
104/172.4
3,868,906 A * 3/1975 Cameron ........... A47G 25/1457
104/89

(Continued)

FOREIGN PATENT DOCUMENTS

DE 10 2012 215 364 4/2014
EP 2 781 471 9/2014

(Continued)

OTHER PUBLICATIONS

PCT/AT2017/060204, Dec. 7, 2017, English Translation of International Search Report and Written Opinion.

Primary Examiner — Kyle O Logan
(74) Attorney, Agent, or Firm — Workman Nydegger

(57) ABSTRACT

The invention relates to an automated storage system comprising at least two shelves having storage locations for storing load carriers comprising articles, wherein the load carriers are storable in a storage direction in the storage locations, and a shelve aisle formed by the two shelves, in which a load reception means comprising a transfer means is movable in a travel direction in order to store at least one load carrier transported with the load reception means from the load reception means in the storage location or to pick up at least one load carrier from the storage location onto the load reception means during a transfer procedure with the transfer means, and the transfer means comprises rotation means in order to rotate the load carrier during the transfer procedure between the travel direction on the load reception means and the storage direction in the storage location.

13 Claims, 3 Drawing Sheets

(56) References Cited

U.S. PATENT DOCUMENTS

| | | | | |
|---|---|---|---|---|
| 4,279,201 | A | * | 7/1981 | Solomon ................ B65G 9/008 104/100 |
| 4,700,633 | A | * | 10/1987 | Weiselfish .............. B61L 11/08 104/102 |
| 4,903,819 | A | * | 2/1990 | Heinold ................. B65G 47/61 198/465.4 |
| 4,939,999 | A | * | 7/1990 | Burt .......................... B61J 3/00 104/89 |
| 5,103,737 | A | * | 4/1992 | Iwase ................... B65G 19/025 104/88.03 |
| 5,113,998 | A | * | 5/1992 | Grube .................... B65G 47/61 198/465.4 |
| 5,377,814 | A | * | 1/1995 | Smith ................... B07C 5/3412 198/465.4 |
| 5,964,354 | A | * | 10/1999 | Skinner .................... B07C 3/10 198/465.4 |
| 6,415,907 | B1 | * | 7/2002 | Matkovich ............. B65G 47/61 198/465.4 |
| 2001/0051085 | A1 | * | 12/2001 | Klein ................... B65G 1/0457 414/282 |
| 2005/0016820 | A1 | * | 1/2005 | Beyer .................... B65G 47/61 198/662 |
| 2006/0207952 | A1 | * | 9/2006 | Timmons ............... A47G 25/06 211/85.3 |

FOREIGN PATENT DOCUMENTS

| | | |
|---|---|---|
| JP | H04 209104 | 7/1992 |
| JP | 2000 044014 | 2/2000 |
| JP | 2006 327807 | 12/2006 |

\* cited by examiner

AUTOMATED STORAGE SYSTEM FOR TRANSPORTING LOAD CARRIERS ROTATED INTO A TRAVEL DIRECT

The invention relates to an automated storage system comprising at least two shelves having storage locations for storing load carriers comprising articles, wherein the load carriers are storable in a storage direction in the storage locations, and a shelve aisle formed by the two shelves, in which a load reception means comprising a transfer means is movable in a travel direction in order to store at least one load carrier transported with the load reception means from the load reception means into the storage location or to pick up at least one load carrier from the storage location onto the load reception means during a transfer procedure with the transfer means.

The invention also relates to a method for storing load carriers comprising articles in storage locations of two shelves forming a shelve aisle, wherein the load carrier transported in the shelve aisle by means of a load reception means is stored in one of the storage locations of the shelve in a storage direction or the load carrier stored in the storage direction in the storage location is picked up onto the load reception means during a transfer procedure.

The document DE 10 2012 215 364 A1 discloses such an automated storage system for storing articles, such as shirts on clothes hangers, and of articles contained in conveyor bags. Each of the clothes hangers or conveyor bags hangs on an adaptor, which forms a load carrier together with the clothes hanger or conveyor bag and comprises one or more casters and a lug for hanging the clothes hanger or the conveyor bag. The adaptors roll in a slightly inclined profile comprising a slit propelled by gravity or they are conveyed propelled by a chain conveyor in the profile or a hanging conveyor system.

The storage system comprises several shelves having shelve levels arranged on top of one another, in each of which one storage bar oriented in a storage direction forms a storage location in the shelves. A number of adaptors with articles can be stored on the storage bar. Two shelves arranged parallel with each other form a shelve aisle, in which a shelve operator device is movable as load reception means in a travel direction along the shelve aisle. The shelve operator device comprises an intermediate storage bar arranged horizontally in a storage direction and transfer means to pick up adaptors with articles from the storage bar onto the intermediate storage bar during a transfer procedure. However, intermediate storage bars which are slightly inclined are known from the state of the art. The adaptors with articles taken up on the intermediate storage bar may then be moved in the shelve aisle by means of the load reception means in order to remove the articles or to store them again from the intermediate storage bar onto another storage bar in a different storage location during a further transfer procedure.

It has been shown to be disadvantageous during operation of the known automatic storage system that the adaptors with articles storable behind each other or a storage bar in a storage location are limited in their number due to the length of the intermediate storage bar of the load reception means and ultimately by the width of the shelve aisle. Considerations to achieve a higher storage density of articles in this known storage system have shown that the storage depth of the shelves, i.e. the length of the storage bars, may only be increased if the width of the shelve aisle is increased at the same time, which in turn has a disadvantageous effect on the storage density. If the storage depth of the shelves is increased without increasing the width of the shelve aisle, then this will have the result that only part of the adaptors with articles stored on the storage bar fit onto the intermediate storage bars, so that the load reception means has to travel several times in the shelve aisle in order to transport the adaptors with articles from a storage location, which is also disadvantageous.

The task of the invention is to provide an automatic storage system and a method for storing load carriers comprising articles that achieve a storage density as high as possible without increasing the number of travels of the load reception means in the shelve aisle. According to the invention, this task is solved in an automatic storage system by forming the load reception means for transporting at least one load carrier in the travel direction and by the transfer means having rotation means in order to rotate the load carrier during the transfer procedure between the travel direction on the load reception means and the storage direction in the storage location.

According to the invention, this task is solved in a method for storing load carriers comprising articles by rotating the load carrier during the transfer procedure between the storage direction and the travel direction along the shelve aisle and transporting it in travel direction.

This provides the advantage that the load carrier is rotated during the transfer procedure and then transferred onto the intermediate storage bar arranged in travel direction. Since the intermediate storage bar may be much longer in the longitudinal direction of the shelve aisle than the width of the shelve aisle, a significantly higher number of load carriers may be simultaneously moved during one trip of the load reception means. Thus, the number of trips of the load reception means may be reduced. Particularly advantageously the ratio of the storage surface, which is proportional to the length of the storage bars, to the transfer surface, which is given by the surfaces of the shelve aisles, may be improved significantly, so that a higher storage density may be achieved in the inventive storage system. These advantages are also achieved in a storage system with crates, trays, boxes or pallets as load carriers.

These and further advantageous embodiments of the inventive automated storage system and the inventive method are described in more detail referring to the figures.

Figure 1:
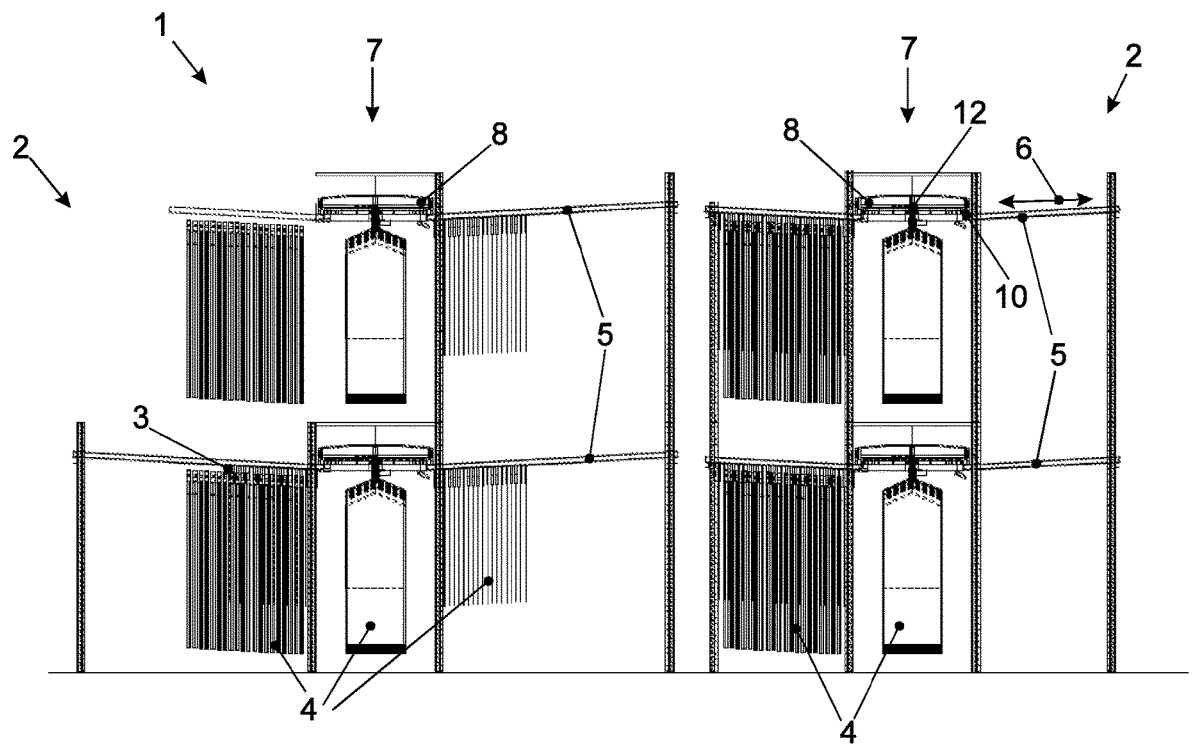
FIG. 1 shows an automated storage system for hanging goods in a side view.
Figure 2:
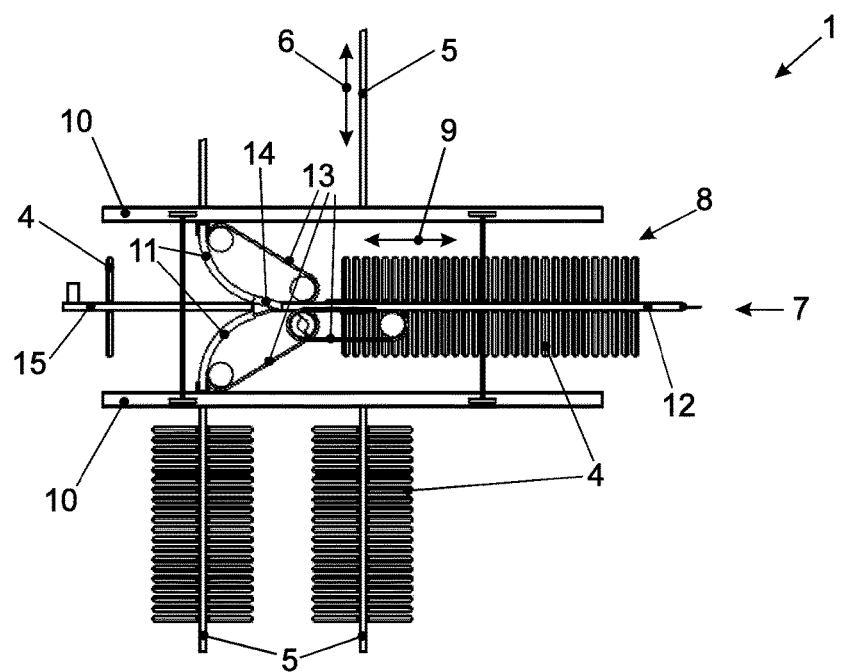
FIG. 2 shows a part of the storage system according to FIG. 1 in a plan view.
Figure 3:
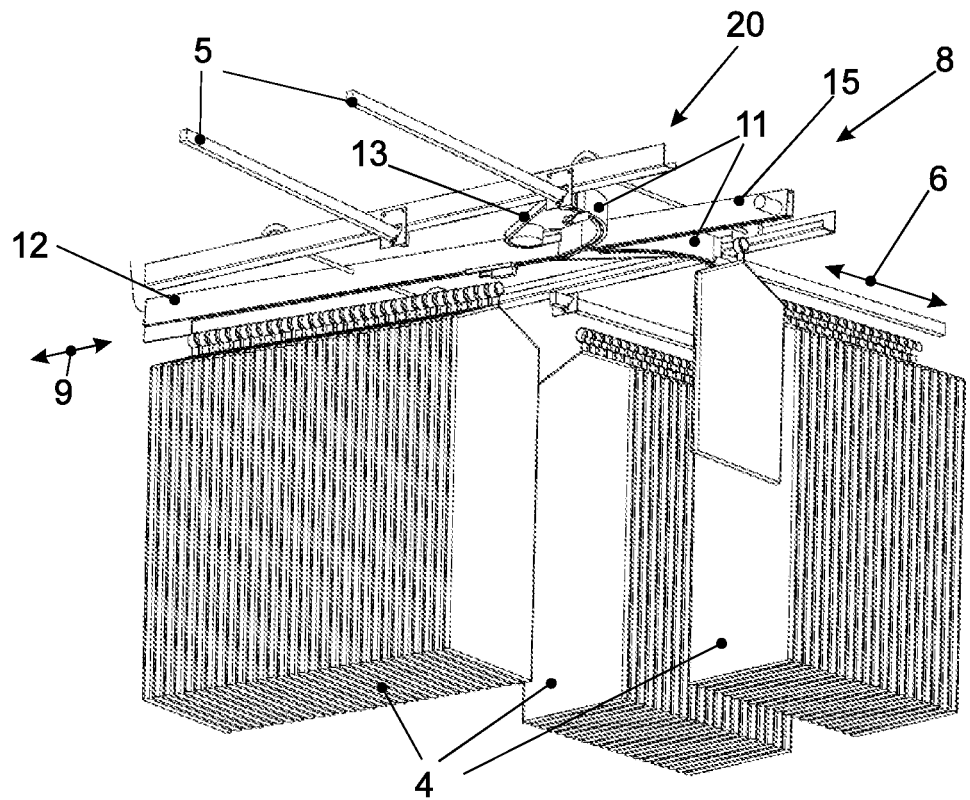
FIG. 3 shows a part of the storage system according to FIG. 2 in an oblique view.

FIG. 1 shows a section of an automated storage system 1 with two shelves 2 having two levels on top of each other. Each shelve 2 is provided with storage locations for storing articles. The articles are, on the one hand, hanging goods, such as shirts or pants hanged on clothes hangers, and on the other hand any articles received separately or together with other articles in conveyor bags. The clothes hangers and the conveyor bags hang on adaptors 3, which are known to a skilled person e.g. from DE 10 2012 215 364 A1, and together form load carriers 4 for carrying the articles.

Every storage location is formed by a storage bar 5 arranged in a storage direction 6, on which or in which the adaptors 3 are movable with their two casters along the storage bar 5 in the storage direction and storable in the storage locations in the storage direction 6. Between any two shelves 2 a shelve aisle 7 is formed, in which a load reception means formed by a level operator device 8 is arranged movably in a travel direction 9 along the shelve aisle 7 on rails 10.

The level operation device 8 comprises two opposite transfer rails 11 in order to form a transfer path from the storage bars 5 of the opposite shelves 2 arranged along shelve aisle 7 to an intermediate storage bar 12. The transfer rails 11 and the intermediate storage bar 12 comprise a chain conveyor 13 to transport the adaptor 3 and hereby form transfer means 20. During a transfer procedure, the transfer means 20 moves one or more load carriers 4 transported by the level operation device 8 from the level operation device 8 to the storage bar 5 and one or more load carries 4 are received from the storage bar 5 onto the intermediate storage bar 12 of the level operation device 8. The storage bars 5 are, for example, inclined by 1 to 5 degrees towards the shelve aisle 7 so that the load carrier 5 on the adaptors 3 roll, propelled by gravity, from the storage bar 5 towards the level operation device 8. A locking unit at the end of the storage bars 5 facing the shelve aisle 7 avoids that the load carrier 4 rolls off the storage bar 5 when the level operation device 8 is not positioned at the storage bar 5. By unlocking the locking unit, the transfer path for the transfer procedure is cleared.

The level operation device 8 is now formed for transporting the load carrier 4 in the travel direction 9. In order to allow this, the level operation device 8 comprises rotation means, which according to this first exemplary embodiment of the invention are formed by the bent transfer rails 11. By means of the transfer rails 11, the load carriers 4 are rotated during the transfer procedure between the travel direction 9 on the level operation device 8 and the storage direction 6 on the storage bar 5. This leads to the advantage that the number of load carriers 4 that may be transported by means of the level operation device 8 is not limited by the width of the shelve aisle 7. The intermediate storage bar 12 may have the same length as the storage bar 5, so that all load carriers 4 stored on a storage bar 5 may be stored or removed with only one trip of the level operation device. However, the intermediate storage bar 12 may also be longer than the storage bar 5 in order to be able to transport even more storage carriers 4 during each trip of the level operation device 8. Thus, with only one trip of the level operation device 8 through the shelve aisle 7, load carriers 4 from a plurality of storage bars 5 from this shelve level may be received on the intermediate storage bar 12 or also presorted into storage locations intended therefor for later use.

In addition, the level operation device 8 comprises a switch 14 at the transition between the two opposite transfer rails 11 and the intermediate storage bar 12, which is formed for switching between the transfer path, located between the storage bars 5 of the opposite storage locations and the intermediate storage bar 12, and a removal path, located between the intermediate storage bar 12 and a removal bar 15. Load carriers 4 may first be transferred from a storage bar 5 onto the intermediate storage bar 12 via the transfer path and, after changing the switch 14 by means of a control, from the intermediate storage bar 12 onto the removal bar 15. The removal bar 15 is inclined downwards starting from the switch 15, for example by 1 to 5 degrees, in order to let the load carriers 4 with their adaptors 3 roll to the end of the removal bar 15. When the level operation device 8 travels to the end of the shelve aisle 7, the removal bar 15 is coupled to a hanging conveyor system not shown in the figures, which is connected to the shelve aisle 7 in the travel direction 9, in order to remove load carriers 4 located on the removal bar 15 from the storage system 1. Such a hanging conveyor system is known to the skilled person and formed to also transport the load carriers 4 over inclinations of 45 degrees and more up and down to a packing location.

In addition, the storage system 1 comprises a hanging conveyor system, not shown in the figures, connected to the shelve aisle 7, which is in the storage direction 6 parallel with the last storage bar 5 arranged at the end of shelve 2. At a goods entrance, the articles intended to be stored in the storage system 1 are hanged onto the hanging conveyor by means of a clothes hanger or a conveyor bag and transported to the shelve aisle 7, from where the load carriers 4 are to be stored in one of the shelves 2 by means of the level operation device 8. The load carrier 4 to be stored in a respective shelve 2 is then transferred via a storage path from the hanging conveyor via the transfer rail 11 onto the intermediate storage bar 12. It is particularly advantageous that the load carrier 4 positioned on the removal bar 15 can be simultaneously transferred to the hanging conveyor, while other load carriers 4 are transferred from the hanging conveyor to the intermediate storage bar 12 for storage via the storage path. This allows accelerating the removal and storage procedure.

Figure 4:
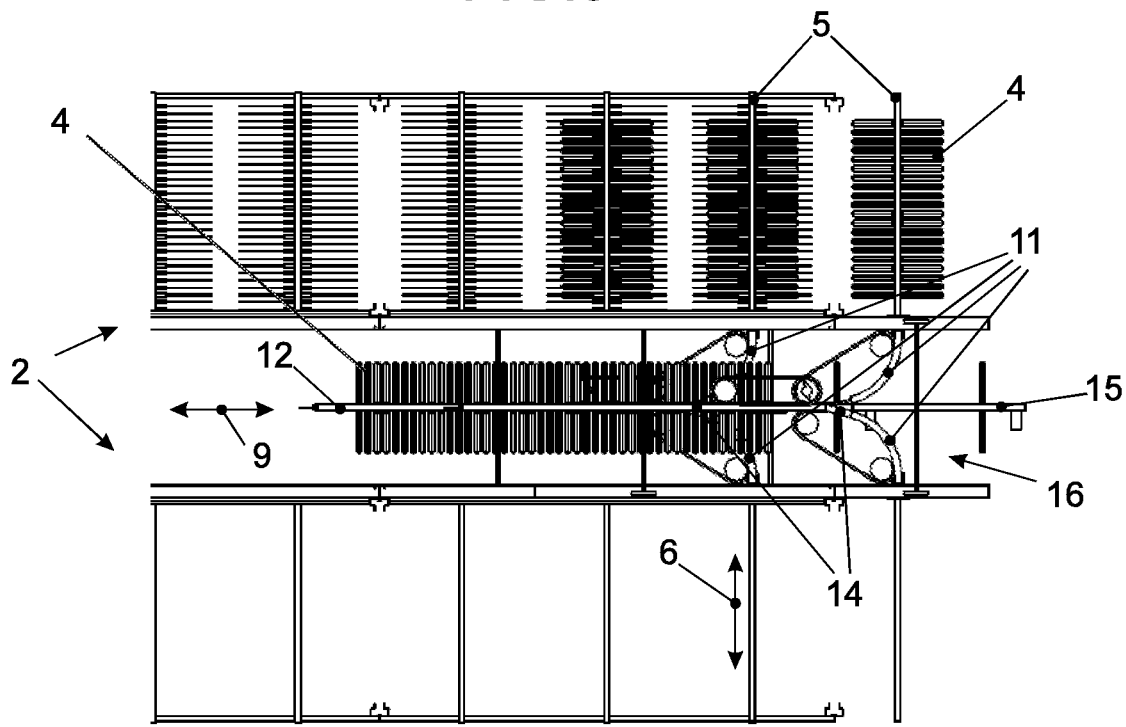
FIG. 4 shows an automated storage system with a load reception means with four transfer paths.

According to another exemplary embodiment of the invention shown in FIG. 4, four transfer rails 11 are provided on a level operation device 16 in order to transport load carriers 4 from neighboring storage locations of opposite shelves 2 onto the intermediate storage bar 12 without moving the level operation device 16. This allows further accelerating the removal and storage procedure. Load reception means with six or eight transfer rails are also implementable in order to simultaneously remove or store load carriers in three or four neighboring storage locations of opposite shelves without having to move the load reception means. Such an exemplary embodiment would be especially advantageous in the e-commerce field.

In the level operation devices 8 and 16, the switches 14 are coupled to selection means at the transfer rails 11. The selection means are formed by an RFID reader reading RFID tags in each of the adaptors 3. In a database of the storage administration computer, serial numbers of the FRID tags of the adaptors 3 are saved together with the article designation of the articles in the respective load carrier 4 during storage. This allows the selecting means, controlled by the storage administration computer, to conduct pre-order picking of the load carriers 4 during removal from the storage locations and to already collect load carriers 4 assigned to one customer order behind each other on the intermediate storage bar 12 of the level operation device 4 from several storage locations of the shelve 2. The load carriers 4 from several levels of shelve 2 transferred to the hanging conveyor system behind each other on the removal bar 15 for a customer order may then be brought together at the packing location by the hanging conveyor system, so that the inventive automated storage system 1 does not require conventional order-picking locations. In addition, transferring the load carriers 4 from the intermediate storage bar 12 to the storage bars 5 may, controlled by the storage administration computer, be conducted selectively by means of the switch 14 coupled by the selecting means, so that several different articles in load carriers 4 may be stored on one single storage bar 5. Consequently, the storage system 1 does not need to store the articles sorted by type, which is advantageous because storage locations can be used much more efficiently.

Figure 5:
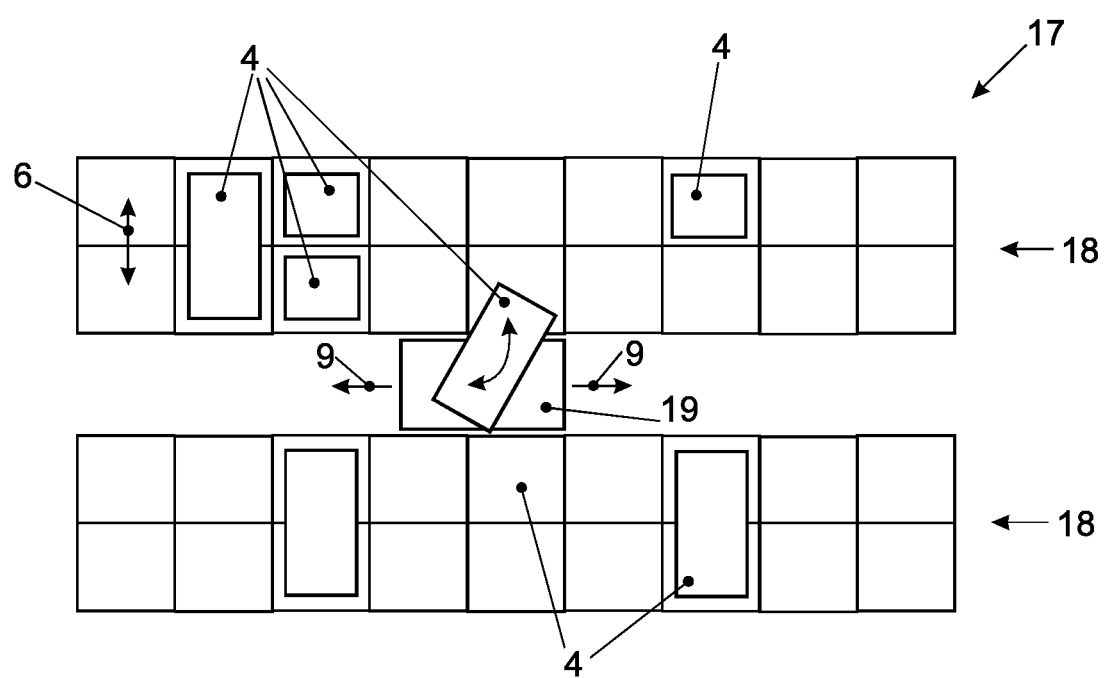
FIG. 5 shows an automated storage system for articles stored in crates as load carrier in a plan view.

FIG. 5 shows an automated storage system 17 for articles stored in crates as load carriers 4 in a plan view. Shelves 18 have double depth in order to allow storage of smaller and bigger crates. A shelve operation device 19 comprises rotation means for rotating the crates during removal from the shelves 18 from the storage direction 6 by 90 degrees to the transport direction 9. The rotation means may be formed by a rotary plate or gripper arms. Also according to this exemplary embodiment of the invention, the advantage is achieved that the shelve aisle can be chosen smaller than the shelve depth.

It may be mentioned that the inventive transfer means may be provided on a level operation device operating only one shelve level or on a shelve operation device operating several shelve levels. The transfer rails may be formed by comparable technical means.

According to another exemplary embodiment of the invention, the storage direction has an angle with regard to the travel direction of the load reception means other than 90 degrees. The storage bars or storage locations can, for example, be arranged at 75 degrees with regard to the travel direction.

According to another exemplary embodiment of the invention, the articles are stored in shelves directly on pallets or trays. This exemplary embodiment also comprises rotating the palette or tray during the transfer procedure.

It may be mentioned that the adaptor may be formed with or without casters.

Furthermore, in may be mentioned that the term "rotate" within the scope of the disclosure of the present document is equivalent with "orient". The rotation means or orientation means rotate or orient the load carrier either in the travel direction on the load reception means or in the storage direction in the storage location. Consequently, rotation of the load carriers, i.e. reorientation of the load carriers, around several axes is also possible during the transfer procedure.

The invention claimed is:

1. An automated storage system comprising:
at least two shelves having storage locations for storing load carriers comprising articles, wherein the load carriers are storable in a storage direction in the storage locations, and
a shelve aisle formed by the two shelves, in which a load reception means comprising a transfer means is movable in a travel direction in order to store at least one load carrier transported with the load reception means from the load reception means in the storage location or to pick up at least one load carrier from the storage location onto the load reception means during a transfer procedure with the transfer means,
wherein the load reception means is formed for transporting at least one load carrier in the travel direction,
wherein the transfer means comprises at least one rotation means in order to rotate the load carrier during the transfer procedure between the travel direction on the load reception means and the storage direction in the storage location, and wherein the load carrier is formed as an adaptor for receiving clothes hangers containing articles or for receiving bags containing articles, characterized in that the storage locations are formed as storage bars that form a transfer path together with the transfer means and an intermediate storage bar of the load reception means during the transfer procedure, in order to transfer the adaptors between storage location and load reception means,
wherein the transfer means comprises at least one bent transfer rail forming the rotation means in order to rotate the adaptor from the storage direction to the travel direction.

2. The automated storage system according to claim 1, wherein the rotation means are formed for rotating the load carriers by essentially 90 degrees during the transfer procedure.

3. The automated storage system according to claim 1, wherein the load carrier is selected from the following group: adaptors for receiving clothes hangers holding articles, adaptors for receiving bags containing articles, a crate, tray, palette, box, bag; and/or wherein the load reception means is selected from the following group: level operation device, shelve operation device.

4. The automated storage system according to claim 1, wherein the load reception means comprises two opposite transfer rails in order to form a transfer path from the storage bars of the opposite shelves arranged along the shelve aisle to the one intermediate storage bar.

5. The automated storage system according to claim 1, wherein a switch is provided at the transition between the transfer rail and the intermediate storage bar, which is formed for switching between the transfer path, located between storage bar and intermediate storage bar, and a removal path, located between intermediate storage bar and a removal bar of the load reception means.

6. The automated storage system according to claim 1, wherein a switch is provided at the transition between the two opposite transfer rails and the intermediate storage bar, which is formed for switching between the transfer path, located between the storage bars of the opposite storage locations and the intermediate storage bar, and the removal path, located between the intermediate storage bar and the removal bar.

7. The automated storage system according to claim 1, wherein a conveyor is provided in the transfer rail and the intermediate storage bar for transporting the adaptors during the transfer procedure.

8. The automated storage system according to claim 1, wherein that a hanging conveyor system is connected to the shelve aisle in the storage direction, from which load carriers to be stored in the shelves are transferable via a storage path from the hanging conveyor via the transfer rails onto the intermediate storage bar.

9. The automated storage system according to claim 1, wherein a vertical conveyor lift is provided at the shelve aisle or in the shelve aisle or in the shelve, wherein the vertical conveyor lift comprises a lift intermediate storage bar, onto which load carriers are movable from the removal bar and/or via the transfer rail from or onto the intermediate storage bar in order to transport it onto a different level of the shelve.

10. The automated storage system according to claim 5, wherein a hanging conveyor system is connected to the shelve aisle in the travel direction or via a corner element in order to remove load carriers located on the removal bar from the storage system.

11. The automated storage system according to claim 1, wherein four or more transfer rails are provided in order to transport load carriers from neighboring storage locations of opposite shelves onto the intermediate storage bar without moving the load reception means.

12. The automated storage system according to claim 6, wherein selection means coupled with the switch are provided, wherein the selection means allow the conduction of pre-order picking of load carriers stored in the storage locations onto the intermediate storage bar of the load reception means.

13. The automated storage system according to claim 6, wherein the conveyor comprises a chain conveyor.

* * * * *